United States Patent
Yamagishi et al.

(10) Patent No.: US 7,508,457 B2
(45) Date of Patent: Mar. 24, 2009

(54) VIDEO SIGNAL PROCESSOR CIRCUIT AND TELEVISION RECEIVER

(75) Inventors: Kunio Yamagishi, Tokyo (JP); Takashi Sakaguchi, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 616 days.

(21) Appl. No.: 11/237,858

(22) Filed: Sep. 29, 2005

(65) Prior Publication Data
US 2006/0066756 A1 Mar. 30, 2006

(30) Foreign Application Priority Data
Sep. 30, 2004 (JP) ............... 2004-287701

(51) Int. Cl.
*H04N 5/14* (2006.01)
*H04N 5/202* (2006.01)
*H04N 5/52* (2006.01)

(52) U.S. Cl. ............... 348/672; 348/674; 348/678

(58) Field of Classification Search ............ 348/672, 348/671, 674, 675, 678, 679; 382/168, 169; 358/519, 518, 522; *H04N 5/14, 5/202, 9/69, H04N 5/52*
See application file for complete search history.

(56) References Cited

U.S. PATENT DOCUMENTS 6,373,533 B1 * 4/2002 Kawabata et al. ........... 348/672
7,012,625 B1 * 3/2006 Kobayashi et al. .......... 348/671
2005/0162564 A1 7/2005 Sakaguchi

FOREIGN PATENT DOCUMENTS

JP 2000-69327 3/2000
JP 2004-7076 1/2004

* cited by examiner

*Primary Examiner*—Sherrie Hsia
(74) *Attorney, Agent, or Firm*—Oblon, Spivak, McClelland, Maier & Neustadt, P.C.

(57) ABSTRACT

A digital Y signal compatible with a plurality of pixels in one frame unit is divided into a plurality of signal level regions for each constant signal level range by means of a histogram generator circuit, a rate of pixels included in each signal level to all the pixels is detected, and a histogram is generated. In addition, a correction coefficient is set, and the correction coefficient is stored in a correction coefficient storage circuit. In a computing circuit, a correction value relevant to a signal level in each signal level region is calculated in accordance with the histogram and correction coefficient, and input and output characteristics of the digital Y signal are adjusted on the basis of the calculated correction value. The digital Y signal is gamma-corrected by a Y-γ correcting circuit in accordance with the input and output characteristics adjusted by the computing circuit.

18 Claims, 4 Drawing Sheets

VIDEO SIGNAL PROCESSOR CIRCUIT AND TELEVISION RECEIVER

CROSS-REFERENCE TO RELATED APPLICATIONS

This application is based upon and claims the benefit of priority from prior Japanese Patent Application No. 2004-287701, filed Sep. 30, 2004, the entire contents of which are incorporated herein by reference.

BACKGROUND OF THE INVENTION

1. Field of the Invention

The present invention relates to an image quality adjuster circuit which adjusts an image quality on a flat panel such as a liquid crystal display or a plasma display and on a CRT display, and more particularly, to a video signal processor circuit which adjusts a contrast and a television receiver.

2. Description of the Related Art

In particular, a flat panel such as a liquid crystal display or a plasma display has a narrow input dynamic range because of its characteristics. In order to efficiently utilize the narrow dynamic range, a dynamic contrast (Y-γ) correcting circuit for arbitrary setting a level of expanding a signal amplitude in response to an input signal state is used.

Conventionally, in one of known Y-γ correcting methods, IRE levels of arbitrary two points are preset, and image quality adjustment is made while a dark portion and a bright portion are distinguished from each other around the set levels. The IRE (Institute of Radio Engineers) level denotes a unit when a pedestal level (reference level) is defined as 0% and a complete while level is defined as 100%.

For example, in a dark scene, the IRE levels of the two points are highly set as compared with a case of a flat characteristic, whereby the amplitude of an input signal at the dark portion is expanded. In a scene having intermediate brightness, the IRE level at the dark portion side is lowly set, and the IRE level at the bright portion side is highly set, as compared with the case of the flat characteristic.

Consequently, the amplitude of the input signal at the dark portion is reduced, and the amplitude of the input signal at the bright portion is expanded. Further, in a bright scene, the IRE levels of the two points are lowly set as compared with the flat characteristic, whereby the amplitude of the input signal at the bright portion is expanded.

However, the above-described conventional Y-γ correcting method makes contrast adjustment by changing the settings of the IRE levels of the two points. Thus, there is inconvenience that optimal adjustment cannot be made for a variety of input signals.

BRIEF SUMMARY OF THE INVENTION

According to one aspect of the present invention, there is provided a video signal processor circuit comprising: a histogram generator circuit which receives a luminance signal compatible with a plurality of pixels, divides the luminance signal compatible with said plurality of pixels in a constant unit into a plurality of signal level regions for each constant signal level range, and detects a rate of pixels included in each signal level to all the pixels in the constant unit to generate a histogram; a correction coefficient storage circuit which stores a correction coefficient after the correction coefficient has been set; a computing circuit which receives the histogram and the correction coefficient, calculates a correction value with respect to a signal level in said each signal level region in response to the histogram and the correction coefficient, and adjusts input and output characteristics of the luminance signal on the basis of the correction value; and a correcting circuit which receives the luminance signal, the correcting circuit being connected to the computing circuit, and gamma-correcting and outputting the luminance signal in accordance with the input and output characteristics adjusted by the computing circuit.

DETAILED DESCRIPTION OF THE INVENTION

Hereinafter, one embodiment of the present invention will be described with reference to the accompanying drawings.

Figure 1:
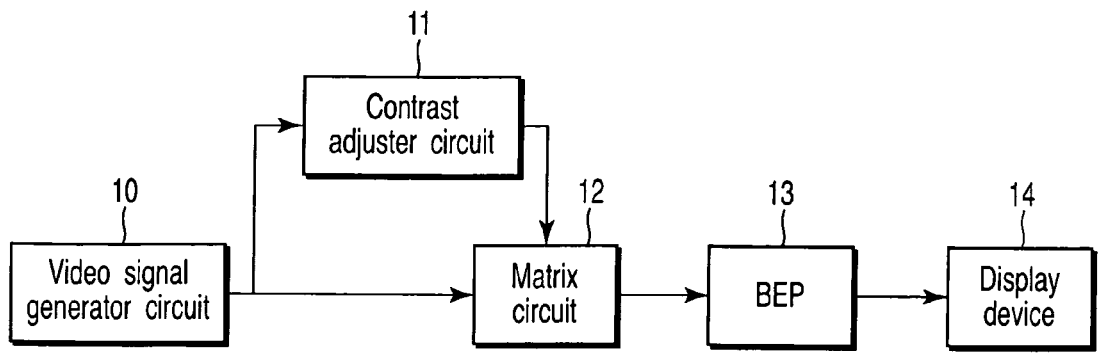
FIG. 1 is a block diagram depicting a configuration of a television receiver according to an embodiment of the present invention.

A television receiver according to an embodiment of the invention includes a video signal generator circuit 10, a contrast adjuster circuit 11, a matrix circuit 12, a back end processor (PEB) 13, and a display device 14, as depicted in the block diagram of FIG. 1.

The video signal generator circuit 10 generates a video signal which includes a luminance signal and a chrominance signal. The contrast adjuster circuit 11 receives the luminance signal compatible with a plurality of pixels from the video signal generator circuit 10, and adjusts and outputs a contrast of the luminance signal. The matrix circuit 12 receives the chrominance signal from the video signal generator circuit 10 and receives the luminance signal whose contrast has been adjusted from the contrast adjuster circuit 11, and then, outputs an RGB signal on the basis of both of the signals. The BEP 13 receives the RGB signal from the matrix circuit 12, carries out signal processing adapted to the display device 14, and supplies the processed signal to the display device 14. The display device 14 displays a picture.

For example, in the case where the display device 14 is a liquid crystal display having a liquid crystal panel, the BEP 13 receives the RBG signal from the matrix circuit 12, and carries out a scaling process or the like for the RGB signal in accordance with the resolution of the liquid crystal panel. In the case where the display device 14 is a plasma display having a plasma display panel, the BEP 13 receives the RGB signal from the matrix circuit 12, and carries out a scaling process or the like for the RGB signal in accordance with the resolution of the plasma display. Further, in the case where the display device 14 is a CRT display having a CRT, the BEP 13 receives the RGB signal from the matrix circuit 12, carries out digital to analog conversion, and then, carries out a process for generating a signal which controls a deflecting system of the CRT display.

Figure 2:
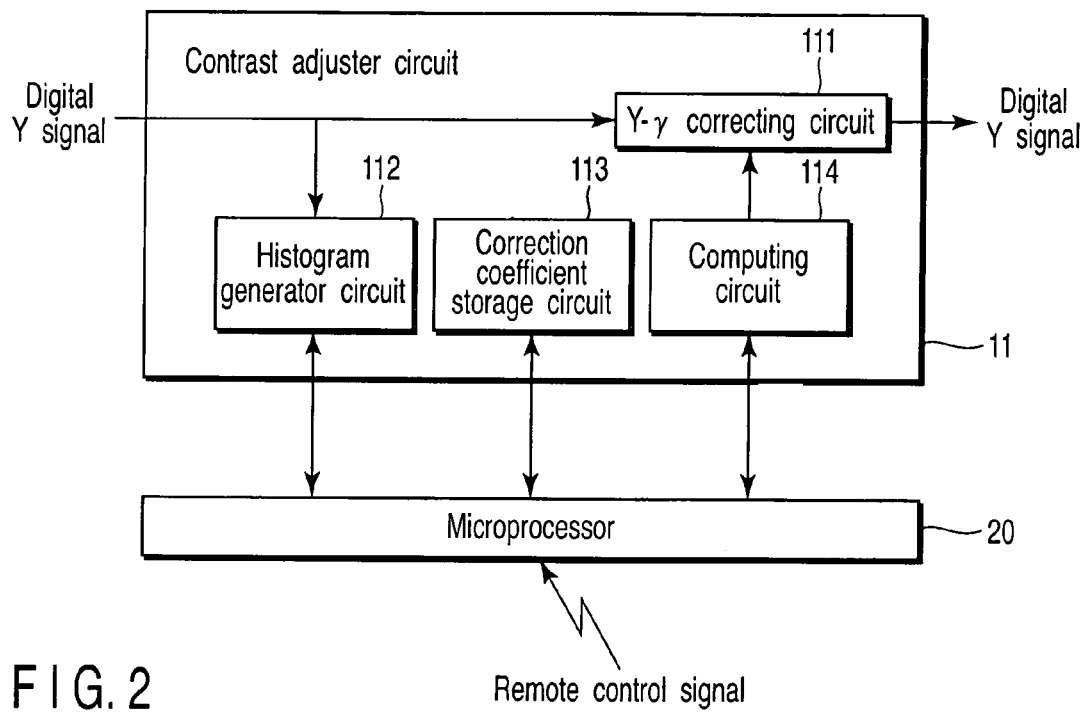
FIG. 2 is a block diagram depicting a specific configuration of a video signal processor circuit shown in FIG. 1.

FIG. 2 is a block diagram depicting a detailed configuration of the contrast adjuster circuit 11 shown in FIG. 1. The contrast adjuster circuit 11 makes contrast adjustment in response to a state of a digital Y (luminance) signal to be inputted, and includes a Y-γ correcting circuit 111, a histogram generator circuit 112, a correction coefficient storage circuit 113, and a computing circuit 114.

A microprocessor 20 controls an operation of the contrast adjuster circuit 11 and provides settings of a variety of data in response to a remote control signal.

The histogram generator circuit 112 divides a digital Y signal which corresponds to a plurality of pixels in a constant unit, for example, in one frame (one screen) into a plurality of signal levels for each constant signal level range, detects a rate of the pixels included in each signal level region relevant to all the pixels, and generates a histogram. In the histogram generator circuit 112, the constant signal level range is arbitrarily set when the digital Y signal is divided into a plurality of signal level regions in response to the data sent from the microprocessor 20. For example, a signal level range for each 20 (IRE) is set, the range being obtained by dividing a maximum value 100 (IRE) of the digital Y signal into 5 equal sections.

In the correction coefficient storage circuit 113, a correction coefficient is set in response to the data sent from the microprocessor 20, and the correction coefficient is stored.

The histogram generated by the histogram generator circuit 112 and the correction coefficient stored in the correction coefficient storage circuit 113 are supplied to the computing circuit 114 via the microprocessor 20. Then, the computing circuit 114 calculates a correction value relevant to the signal level in the each signal level region in response to the histogram and correction coefficient. Further, the computing circuit 114 sets the calculated correction value as an increment relevant to the maximum output signal level in each of the corresponding signal level regions, and carries out approximation between the minimum output signal level and the maximum output signal level in each of the signal level regions, thereby adjusting the input and output characteristics of a luminance signal.

The Y-γ correcting circuit 111 carries out gamma (γ) correction with respect to a digital Y signal of a next frame inputted to the contrast adjuster circuit 11 in accordance with the input and output characteristics adjusted by the computing circuit 114.

Now, an operation of the contrast adjuster circuit 11 shown in FIG. 2 will be described here. When the digital Y signal is inputted to the contrast adjuster circuit 11, a histogram is generated by the histogram generator circuit 112. The histogram is sent to the computing circuit 114 via the microprocessor 20 together with the correction coefficient stored in advance in the correction coefficient storage circuit 113. The computing circuit 114 calculates the correction value relevant to the signal level in each signal level region in accordance to the histogram and correction coefficient, and further, adjusts the input and output characteristics of the luminance signal. The Y-γ correcting circuit 111 carries out gamma correction with respect to the digital Y signal of the next frame inputted to the contrast adjuster circuit 11 in accordance with the input and output characteristics adjusted by the computing circuit 114.

Figure 3:
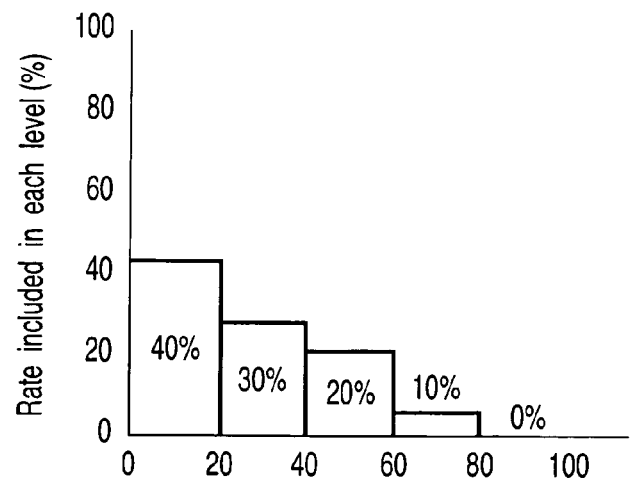
FIG. 3 is a view showing an example of a histogram generated by a histogram generator circuit shown in FIG. 2.

FIG. 3 shows an example of the histogram generated by the histogram generator circuit 112. This example assumes a case in which the digital Y signal compatible with a plurality of pixels in one frame is divided into five signal level regions on a 20 (IRE) range by range basis. In addition, this example shows a case in which a rate of pixels included in a signal level region in a range from 0 (IRE) to 20 (IRE) is 40 (%); a rate of pixels included in a signal level region in a range from 20 (IRE) to 40 (IRE) is 30 (%); a rate of pixels included in a signal level region in a range from 40 (IRE) to 60 (IRE) is 20 (%); a rate of pixels included in a signal level region in a range from 60 (IRE) to 80 (IRE) is 10 (%); and a rate of pixels included in a signal level region in a range from 80 (IRE) to 100 (IRE) is 0 (%).

Such a histogram may be generated by, for example, detecting a value of the inputted digital signal on a pixel by pixel basis, detecting which of the five signal level regions the value belongs to, and counting the number of pixels which belong to each signal level region after one-frame detection has terminated, in the histogram generator circuit 112.

The computing circuit 114 uses the histogram generated as described above and the correction coefficient stored in advance in the correction coefficient storage circuit 113 to calculate the correction value relevant to the signal level in each signal level region as follows. That is, when a rate of pixels included in each signal level region detected by the histogram generator circuit 112 is "x" (%); a constant signal level range obtained when dividing the digital Y signal into a plurality of signal level regions is "y" (%); a rate of each signal level to all the signal level regions is z (%); and the correction coefficient is Y (IRE), the computing circuit 114 calculates a correction value "a" relevant to the signal level in each signal level region on the basis of a computing formula given by:

$$a = y(\text{IRE}) + \{x(\%) - z(\%)\} \times Y(\text{IRE}) \tag{1}$$

In the example of the histogram shown in FIG. 3, the signal level range "y" obtained when dividing the digital Y signal into five signal level regions is 20 (IRE), and the rate "z" of each signal level region to all the signal level regions is obtained by 20 (IRE)/100 (IRE)=20 (%).

Here, assuming that the correction coefficient Y stored in advance in the correction coefficient storage circuit 113 is 25 (IRE), the computing circuit 114 calculates the correction value "a" relevant to the signal level in each signal level range as follows. However, the signal level indicated at the right side of each signal level range does not include a boundary value.

(1) Signal level region having signal level range between 0 and 20 (IRE)

$$\begin{aligned} a &= y\ (IRE) + \{x\ (\%) - z\ (\%)\} \times Y\ (IRE) \\ &= 20\ (IRE) + \{0.4 - 0.2\} \times 25\ (IRE) \\ &= 20\ (IRE) + 5\ (IRE) \\ &= 25\ (IRE) \end{aligned} \tag{2}$$

(2) Signal level region having signal level range between 20 and 40 (IRE)

$$a = y\ (IRE) + \{x\ (\%) - z\ (\%)\} \times Y\ (IRE) \quad (3)$$
$$= 20\ (IRE) + \{0.3 - 0.2\} \times 25\ (IRE)$$
$$= 20\ (IRE) + 2.5\ (IRE)$$
$$= 22.5\ (IRE)$$

(3) Signal level region having signal level range between 40 and 60 (IRE)

$$a = y\ (IRE) + \{x\ (\%) - z\ (\%)\} \times Y\ (IRE) \quad (4)$$
$$= 20\ (IRE) + \{0.2 - 0.2\} \times 25\ (IRE)$$
$$= 20\ (IRE) + 0\ (IRE)$$
$$= 20\ (IRE)$$

(4) Signal level region having signal level range between 60 and 80 (IRE)

$$a = y\ (IRE) + \{x\ (\%) - z\ (\%)\} \times Y\ (IRE) \quad (5)$$
$$= 20\ (IRE) + \{0.1 - 0.2\} \times 25\ (IRE)$$
$$= 20\ (IRE) - 2.5\ (IRE)$$
$$= 17.5\ (IRE)$$

(5) Signal level region having signal level range between 80 and 100 (IRE)

$$a = y\ (IRE) + \{x\ (\%) - z\ (\%)\} \times Y\ (IRE) \quad (6)$$
$$= 20\ (IRE) + \{0 - 0.2\} \times 25\ (IRE)$$
$$= 20\ (IRE) - 5\ (IRE)$$
$$= 15\ (IRE)$$

That is, the correction values "a" in signal level regions having signal level ranges between 0 and 20 (IRE), between 20 and 40 (IRE), between 40 and 60 (IRE), between 60 and 80 (IRE), and between 80 and 100 are obtained as 25 (IRE), 22.5 (IRE), 20 (IRE), 17.5 (IRE), and 15 (IRE), respectively.

The computing circuit 114 further adjusts the input and output characteristics of the digital Y signal by using the correction values calculated as described above. This adjustment is made as follows. That is, the calculated correction value is set as an increment relevant to the maximum output signal level in each of the corresponding signal level regions, and the set increment is linearly approximated between the minimum output signal level and the maximum output signal level in each of the signal level regions, thereby adjusting the input and output characteristics of the luminance signal.

Figure 4:
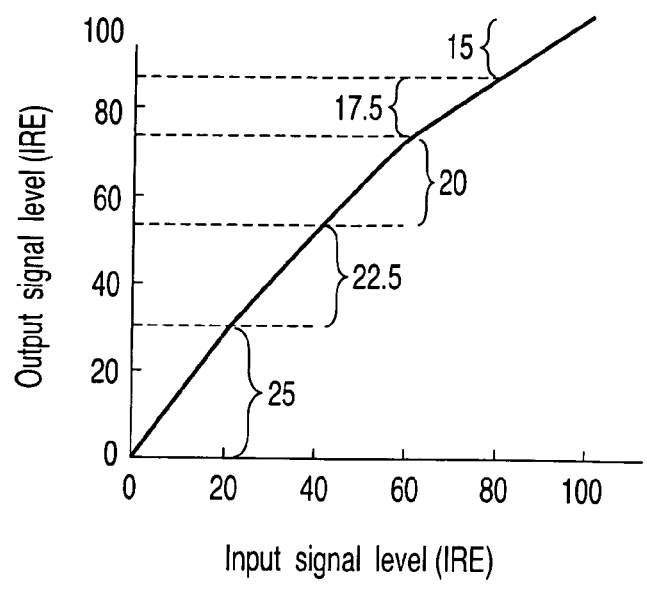
FIG. 4 is a view showing an example of input and output characteristics adjusted by using the histogram shown in FIG. 3.

FIG. 4 shows an example of the input and output characteristics adjusted by using the histogram as shown in FIG. 3.

The correction value in a signal level region having a signal level range between 0 (IRE) and 20 (IRE) is 25 (IRE). In this signal level region, input and output characteristics are linearly approximated between 0 and 25 (IRE) such that the maximum output signal level is 25 (IRE). Since the correction value 25 (IRE) in this signal level region is sufficiently greater than the signal level range y (y=20 (IRE)), the contrast is greatly enhanced in this signal level region as compared with that of a flat characteristic.

The correction value in a signal level region having a signal level range between 20 (IRE) and 40 (IRE) is 22.5 (IRE). In this signal level region, the correction value 22.5 (IRE) is added as an increment relevant to 25 (IRE) which is the maximum output signal level in the signal level region whose signal level range is between 0 and 20 (IRE), and the maximum output signal level is 25 (IRE)+22.5 (IRE)=47.5 (IRE). Then, the input and output characteristics are linearly approximated between the minimum output signal level 25 (IRE) and the maximum output signal level 47.5 (IRE). Since the correction value 22.5 (IRE) in this signal level region is slightly greater than the signal level range "y" (y=20 (IRE)), the contrast is slightly enhanced in this signal level region as compared with that of a flat characteristic.

The correction value in a signal level region having a signal level range between 40 (IRE) and 60 (IRE) is 20 (IRE). In this signal level region, the correction value 20 (IRE) is added as an increment relevant to 47.5 (IRE) which is the maximum output signal level in the signal level region whose signal level range is between 20 and 40 (IRE), and the maximum output signal level is 47.5 (IRE)+20 (IRE)=67.5 (IRE). Then, the input and output characteristics are linearly approximated between the minimum output signal level 47.5 (IRE) and the maximum output signal level 67.5 (IRE). Since the correction value 20 (IRE) in this signal level region is equal to the signal level range "y" (y=20 (IRE)), the contrast is not adjusted in this signal level region more significantly than that of a flat characteristic.

The correction value in a signal level region having a signal level range between 60 (IRE) and 80 (IRE) is 17.5 (IRE). In this signal level region, the correction value 17.5 (IRE) is added as an increment relevant to 67.5 (IRE) which is the maximum output signal level in the signal level region whose signal level range is between 40 and 60 (IRE), and the maximum output signal level is 67.5 (IRE)+17.5 (IRE)=85 (IRE). Then, the input and output characteristics are linearly approximated between the minimum output signal level 67.5 (IRE) and the maximum output signal level 85 (IRE). The correction value 17.5 (IRE) in this signal level region is slightly smaller than the signal level range "y" (y=20 (IRE)), and thus, in this signal level region, the contrast is slightly reduced as compared with that of a flat characteristic.

Further, the correction value in a signal level region having a signal level range between 80 (IRE) and 100 (IRE) is 15 (IRE). In this signal level region, the correction value 15 (IRE) is added as an increment relevant to 85 (IRE) which is the maximum output signal level in the signal level region whose signal level range is between 60 and 80 (IRE), and the maximum output signal level is 85 (IRE)+15 (IRE)=100 (IRE). Then, the input and output characteristics are linearly approximated between the minimum output signal level 85 (IRE) and the maximum output signal level 100 (IRE). The correction value 15 (IRE) in this signal level region is sufficiently smaller than the signal level range "y" (y=20 (IRE)), and thus, in this signal level region, the contrast is significantly reduced as compared with that of a flat characteristic.

In the Y-γ correcting circuit 111, the input digital Y signal is gamma-corrected in accordance with the input and output characteristics linearly approximated as described above, whereby contrast adjustment is made.

In this way, in the contrast adjuster circuit 11 shown in FIG. 2, the input and output characteristics are adjusted in accordance with the histogram detection result of the digital Y signal, and gamma correction is carried out such that the contrast is expanded in a signal level region including a large amount of signal components and such that the contrast is reduced in a signal level region including a small amount of signal components. Thus, optimal adjustment can be made for a variety of input signals.

Now, a result obtained by carrying out gamma-correction with respect to a variety of digital Y signals by using the contrast adjuster circuit 11 of FIG. 2 will be described in comparison with a conventional method.

Figure 5A:
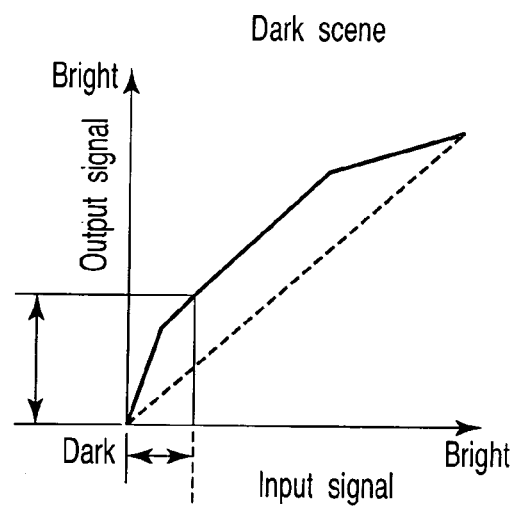
FIGS. 5A and 5B are views each showing a result obtained by carrying out γ-correction with respect to a digital Y signal which corresponds to a dark scene by using the video signal processor circuit of FIG. 2 in contrast to a conventional method.
Figure 5B:
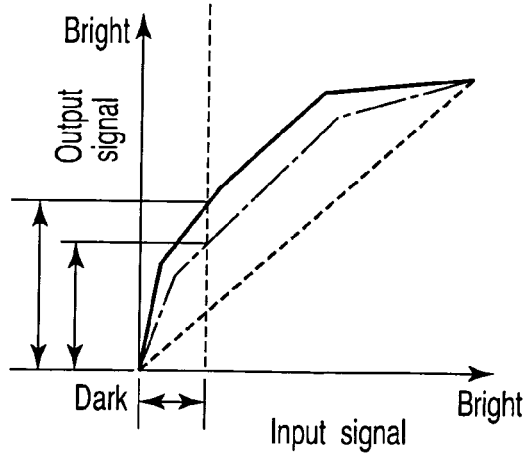
Figure 6A:
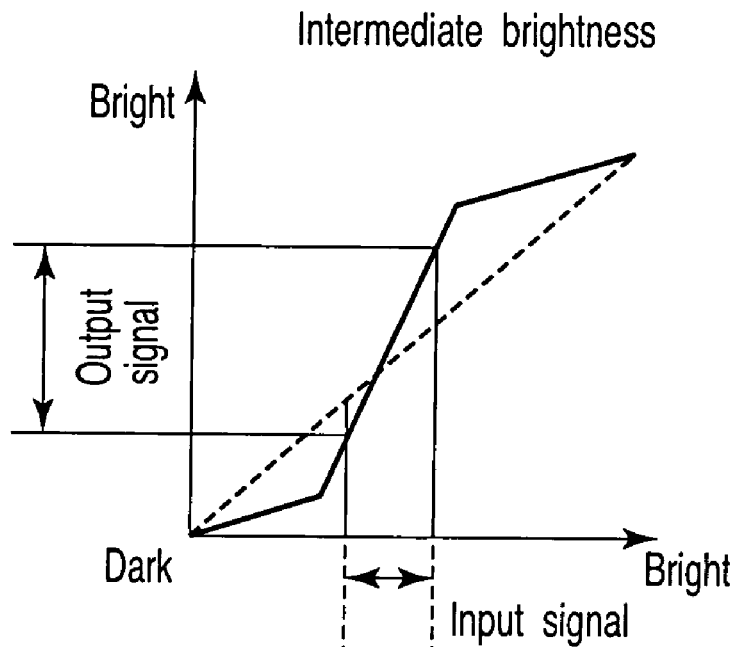
FIGS. 6A and 6B are views each showing a result obtained by carrying out γ-correction with respect to a digital Y signal which corresponds to a scene having intermediate brightness by using the video signal processor circuit of FIG. 2 in contrast to a conventional method.
Figure 6B:
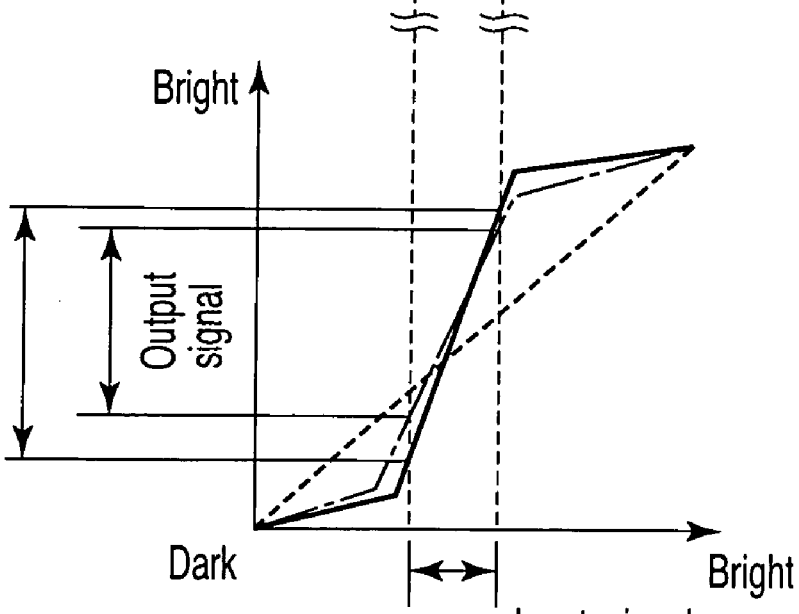
Figure 7A:
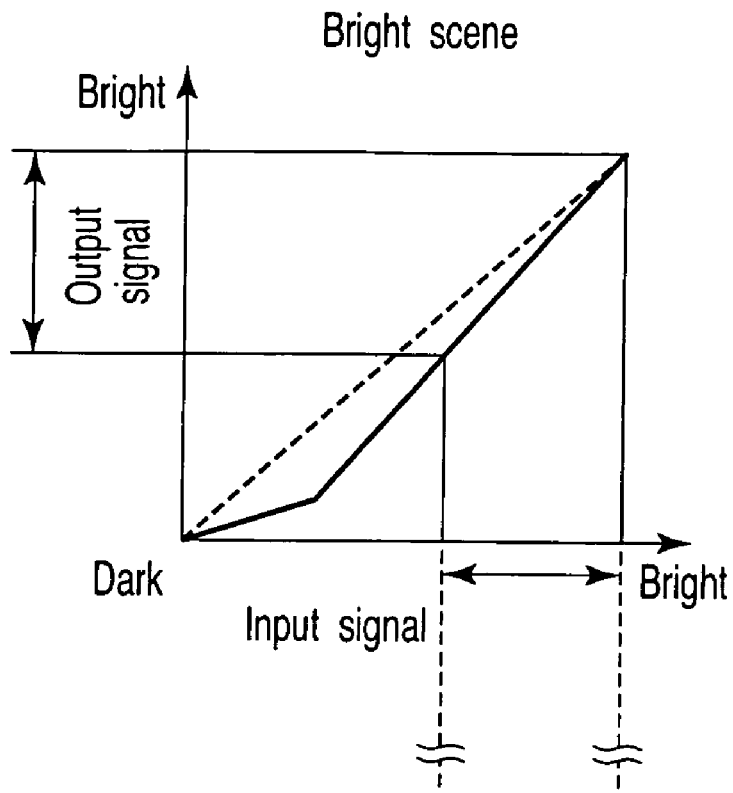
FIGS. 7A and 7B are views each showing a result obtained by carrying out γ-correction with respect to a digital Y signal which corresponds to a bright scene by using the video signal processor circuit of FIG. 2 in contrast to a conventional method.
Figure 7B:
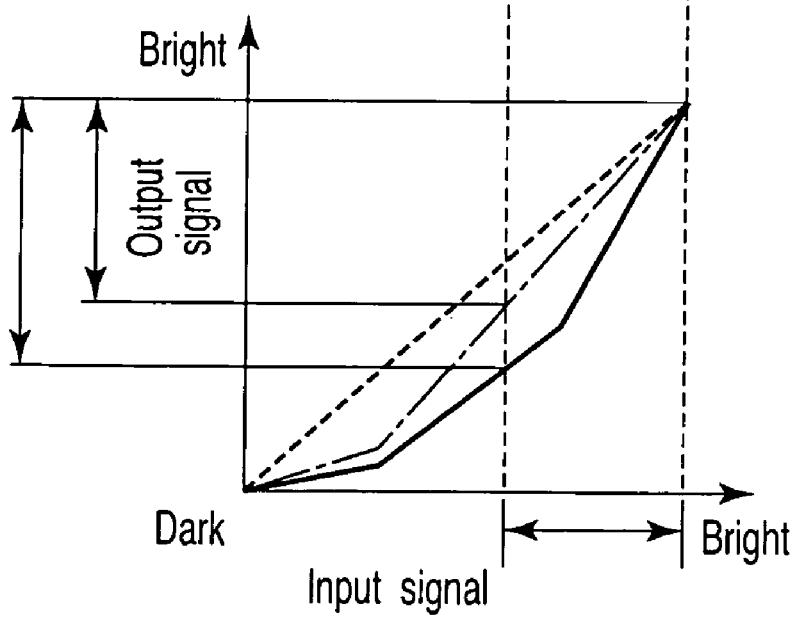

FIGS. 5A, 5B, 6A, 6B, 7A and 7B shows cases in which digital Y signals have been inputted, the Y signals corresponding to a dark scene, a scene having intermediate brightness, and a bright scene, respectively. Each of FIGS. 5A, 6A and 7A shows a case of using the conventional method, and each of FIGS. 5B, 6B and 7B show a each of using the circuit according to the embodiment shown in FIG. 2. In each of FIGS. 5A to 7B, the characteristics indicated by dashed line indicates frat characteristics, and the characteristics indicated by single dotted chain line in each of FIGS. 5B, 6B and 7B indicate characteristics using the conventional method shown in each of FIGS. 5A, 6A and 7A.

In the conventional method, in any of a dark scene, a scene having intermediate brightness and a bright scene, a signal level is expanded, and a contrast is enhanced. However, in the case of the above-described embodiment, fine contrast adjustment can be made over a wide range of a signal level. Moreover, by greatly setting a value of the previously defined correction coefficient Y, the degree of contrast expansion can be increased, so that the contrasts in a dark scene and a bright scene are enhanced in particular.

Of course, the present invention is not limited to the above-described embodiment, and a variety of modifications are possible. For example, the above embodiment has described a case of dividing the luminance signal compatible with a plurality of pixels in one frame into a plurality of signal level regions for each constant signal level range, and a histogram is generated by detecting a rate of pixels included in each signal level region relevant to all the pixels. However, modification may be made so as to generate a histogram in response to the luminance signal compatible with, for example, a plurality of pixels in a single scanning line instead of a plurality of pixels in one frame.

In addition, the foregoing description has been given with respect to a case of dividing the luminance signal compatible with a plurality of pixels into a plurality of signal level regions, for example, into five signal level regions, for each constant signal level range. However, the luminance signal may be divided into more than 5 signal level regions, for example, 10 signal level regions. Finer contrast adjustment can be made by dividing the signal into many more signal level regions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video signal processor circuit comprising:
a histogram generator circuit which receives a luminance signal compatible with a plurality of pixels, divides the luminance signal compatible with said plurality of pixels in a constant unit into a plurality of signal level regions for each constant signal level range, arbitrarily sets the constant signal level range when the luminance signal is divided into said plurality of signal level regions, and detects a rate of pixels included in each signal level to all the pixels in the constant unit to generate a histogram;
a correction coefficient storage circuit which stores a correction coefficient after the correction coefficient has been set;
a computing circuit which receives the histogram and the correction coefficient, calculates a correction value with respect to a signal level in said each signal level region in response to the histogram and the correction coefficient, and adjusts input and output characteristics of the luminance signal on the basis of the correction value; and
a correcting circuit which receives the luminance signal, the correcting circuit being connected to the computing circuit, and gamma-correcting and outputting the luminance signal in accordance with the input and output characteristics adjusted by the computing circuit.

2. A video signal processor circuit according to claim 1, wherein the luminance signal is a digitized signal.

3. A video signal processor circuit according to claim 1, wherein the constant unit is one frame.

4. A video signal processor circuit according to claim 1, wherein the constant unit is one scanning line.

5. A video signal processor circuit according to claim 1, wherein the histogram generator circuit sets the constant signal level range to 20.

6. A video signal processor circuit according to claim 1, wherein,
when a rate of pixels included in each signal level region detected by the histogram generator circuit is x (%);
the constant signal level range obtained when dividing the luminance signal into a plurality of signal level regions is y (%);
a rate of each signal level to all the signal level regions is z (%); and
the correction coefficient is Y, the computing circuit calculates a correction value "a" relevant to the signal level in said each signal level region on the basis of a computing formula given by: $a = y(\text{IRE}) + \{x(\%) - z(\%)\} * Y(\text{IRE})$.

7. A video signal processor circuit according to claim 6, wherein the computing circuit sets the calculated correction value "a" as an increment relevant to a maximum output signal level in said each of the corresponding signal level regions, and linearly approximates the set increment between a minimum output signal level and a maximum output signal level in each of the signal level regions, thereby adjusting input and output characteristics of the luminance signal.

8. A television receiver comprising:
a video signal generator circuit which generates a video signal including a luminance signal and a chrominance signal;
a contrast adjuster circuit which receives the luminance signal compatible with a plurality of pixels from the video signal generator circuit and which adjusts and outputs a contrast of the luminance signal, a matrix circuit which receives the chrominance signal from the video signal generator circuit, receives the luminance signal whose contrast has been adjusted from the contrast adjuster circuit, and outputs an RGB signal on the basis of both the color and luminance signals;
a display device which displays a picture; and a back-end processor which receives the RGB signal from the matrix circuit, carries out signal processing adapted to the display device, and supplies the processed signal to the display device, the contrast adjuster circuit including:

a histogram generator circuit which receives the luminance signal compatible with a plurality of pixels, divides the luminance signal compatible with said plurality of pixels in a constant unit into a plurality of signal level regions for each constant signal level range, and detects a rate of pixels included in each signal level to all the pixels in the constant unit to generate a histogram;

a correction coefficient storage circuit which stores a correction coefficient after the correction coefficient has been set;

a computing circuit which receives the histogram and the correction coefficient, calculates a correction value with respect to a signal level in said each signal level region in response to the histogram and the correction coefficient, and adjusts input and output characteristics of the luminance signal on the basis of the correction value; and a correcting circuit which receives the luminance signal, the correcting circuit being connected to the computing circuit, and gamma-correcting and outputting the luminance signal in accordance with the input and output characteristics adjusted by the computing circuit.

9. A television receiver according to claim 8, wherein the luminance signal and the chrominance signal are digitized signals.

10. A television receiver according to claim 8, wherein the constant unit is one frame.

11. A television receiver according to claim 8, wherein the constant unit is one scanning line.

12. A television receiver according to claim 8, wherein the histogram generator circuit arbitrarily sets the constant signal level range when the luminance signal is divided into said plurality of signal level regions.

13. A television receiver according to claim 12, wherein the histogram generator circuit sets the constant signal level range to 20.

14. A television receiver according to claim 8, wherein, when a rate of pixels included in each signal level region detected by the histogram generator circuit is x (%);

the constant signal level range obtained when dividing the luminance signal into a plurality of signal level regions is y (%);

a rate of each signal level to all the signal level regions is z (%); and the correction coefficient is Y, the computing circuit calculates a correction value "a" relevant to the signal level in said each signal level region on the basis of a computing formula given by: $a = y(IRE) + \{x(\%) - z(\%)\} * Y(IRE)$.

15. A television receiver according to claim 14, wherein the computing circuit sets the calculated correction value "a" as an increment relevant to a maximum output signal level in said each of the corresponding signal level regions, and linearly approximates the set increment between a minimum output signal level and a maximum output signal level in each of the signal level regions, thereby adjusting input and output characteristics of the luminance signal.

16. A television receiver according to claim 8, wherein the display device is a liquid crystal display having a liquid crystal panel, and the back-end processor receives an RGB signal from the matrix circuit and carries out a scaling process of the RGB signal in accordance with resolution of the liquid crystal panel.

17. A television receiver according to claim 8, wherein the display device is a plasma display having a plasma display panel, and the back-end processor receives an RGB signal from the matrix circuit and carries out a scaling process of the RGB signal in accordance with resolution of the plasma panel.

18. A television receiver according to claim 8, wherein the display device is a CRT display having a CRT, and the back-end processor receives an RGB signal from the matrix circuit and carries out a process for generating a signal which controls a deflecting system of the CRT display.

* * * * *